Patented June 24, 1930

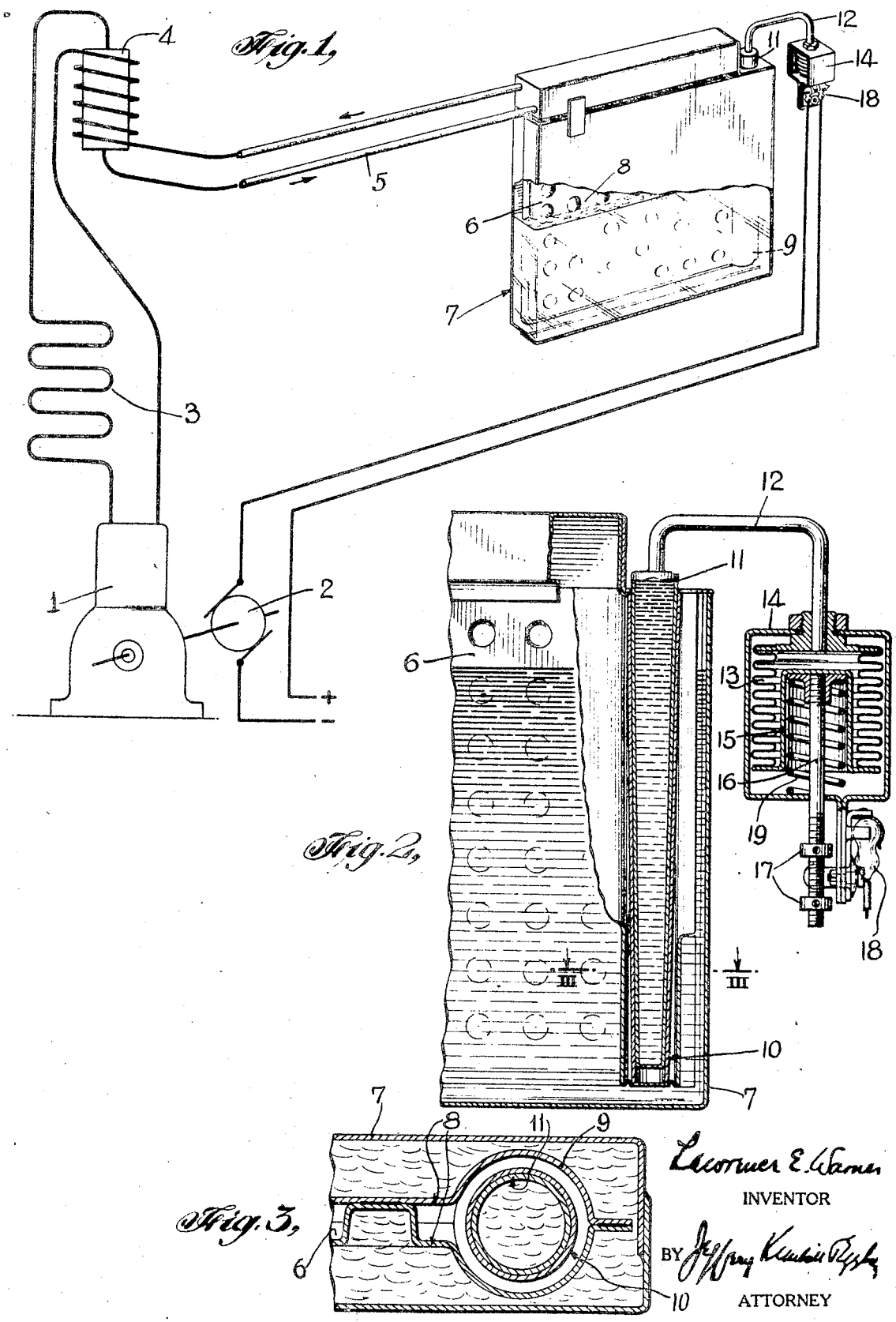

1,765,387

UNITED STATES PATENT OFFICE

LAWRENCE E. WARNER, OF NEW HARTFORD, NEW YORK, ASSIGNOR TO SAVAGE-DE REMER CORPORATION, OF NEW YORK, N. Y., A CORPORATION OF NEW YORK

TEMPERATURE CONTROL

Application filed August 14, 1926. Serial No. 129,125.

This invention relates generally to the control of temperatures and in particular to the automatic control of refrigerating apparatus.

The object of the invention is to provide a simple and efficient means of control and method for maintaining constant temperature by utilizing the change of volume of a medium in passing from its solid to liquid state.

In the accompanying drawings, in which I have shown a preferred form of the invention, Figure 1 represents in diagram the application of the control to a refrigerating system;

Figure 2 a view of the control; and

Figure 3 a section on the line 3—3 of Figure 2.

The refrigerating system to which the invention is shown as applied, forms the subject matter of a co-pending application for improvements in mechanical refrigeration and includes generally a compressor 1 driven by a motor 2 and connected through a condenser 3, valve 4, and inlet pipe 5, to a vaporizer 6 suitably mounted in a receptacle 7, which contains a medium adapted to be frozen. The vaporizer illustrated forms no part of the present invention except as to its adaptation for use in connection with the control device of this invention and for this purpose it will be seen that the sidewalls 8 of the vaporizer are spread apart at 9 to receive a well tube 10 which is welded to them in such manner that the exterior surface of the tube is surrounded by the refrigerant of the vaporizer and the interior of the tube is open to the exterior of the vaporizer.

Within the well tube 10 is placed a closed container 11 which may be called a bulb element because it is the sensitive element of a thermostatic system including the tube, bellows and switch (hereinafter described) which controls the motor. This element holds a quantity of freezing or storage medium which may be and preferably is the same as that used in the receptacle 7.

The freezing medium in the receptacle 7 is compounded with reference to the constant temperature which it is desired to maintain in the storage compartment. It may consist of an aqueous salt solution, the eutectic freezing point of which approximates that temperature. As is well known, the solution of a salt in water freezes at a lower temperature than the water alone and, within limits, the more salt that is added, the lower in general becomes the temperature of freezing. If a salt solution, of less than saturation strength, be subjected to a decreasing temperature, the effect is first to freeze out some of the water in the form of pure ice crystals, and correspondingly concentrate the remaining liquid until it becomes a saturated solution at a particular temperature. If this particular temperature is not low enough to freeze such a saturated solution, further depression of the temperature will cause a precipitation of some of the salt until a temperature is reached at which the solution, still saturated, freezes, producing a conglomerate mass of mixed crystals closely interwoven. The temperature at which this occurs is termed the eutectic freezing point of the mixture of the salt and water, and is different for different salts. The solid or frozen product is termed the cryohydrate. The salt employed for the freezing medium of receptacle 7 is selected with reference to its eutectic point, so that the latter shall approximate the constant temperature which it is desired to maintain. When the cryohydrate of such a mixture or solution is used for refrigerating purposes, as in the receptacle 7, the temperature thereof does not increase above the eutectic point until it is nearly all converted back to liquid form, this being recognized, of course, as the effect of the latent heat of fusion of the cryohydrate. It will be seen, therefore, that if the freezing medium, or, as it may be termed, the storage medium, in the receptacle 7 be frozen, it will maintain the storage space at a corresponding low temperature, which may be well under 32° F. for a long period of time, variable, of course, with the rate of leakage and the heat absorbed from such articles as may be on storage.

In the practical use of such a solution wherein it is repeatedly converted from solid to liquid state, the amount of cryohydrate produced on each successive operation tends to become smaller and smaller and the duration of the low temperature period maintained thereby tends to become correspondingly shorter and the efficiency of the system as a whole correspondingly impaired. The cause of this tendency arises from the fact that during the lowering of the temperature of a saturated solution to its freezing point, some of the salt is cooled out of it, following the law that the strength of saturation is inverse to the temperature of the solution. The eliminated salt tends to precipitate and collect in the bottom of the receptacle and on any subsequent rise of the temperature of the solution is not in a position to go back into solution automatically, except perhaps locally or near the bottom of the receptacle. The solution, being thus robbed of some of its salt, is thus no longer saturated on a rising temperature, but as it may still be below 32° F. the excess water at once freezes, forming ice crystals just to the extent necessary to restore saturation strength at the particular temperature. Such ice crystals are produced in increasing quantity as the temperature rises back to 32° F. and, unless preventive measures are taken, the repeated warming and cooling of the receptacle 7 produces larger and larger quantities of clear ice therein, and more and more precipitated salt, eventually destroying the efficiency of the system for maintaining constant low temperature in the storage compartment.

The appropriate remedy for this condition consists either in preventing the isolation of the salt eliminated on cooling or in the provision of means for re-dissolving it in the solution as the temperature rises, so as to keep the solution saturated at all times, but preferably it is accomplished by providing a suitable support for the precipitated salt, so that, on the next warming, it will be well distributed throughout the mass of the solution and thus be retained in position where it can be automatically taken up by the solution to restore it to saturation progressively as the temperature increases. Certain sponge-like materials or fillers are available for this purpose, for example, sawdust, which can be filled into the receptacle 7 so as to fill it more or less completely, thus providing an infinite number of surfaces on which the eliminated salt may rest until again taken up for restoring the saturation strength. Also if the solution be thickened so as to be buoyant to such eliminated salt, the same effect will obviously be produced. The addition of starch to the solution so as to give it a somewhat jelly-like consistency has produced excellent results without apparent effect on the refrigerating function. Other colloids will produce like results, enabling the freezing medium to be frozen and thawed for an indefinite number of times without diminution of the amount of cryohydrate thereafter formed, or otherwise impairing the function of the system in maintaining constant low temperatures over long periods of time.

The preferred freezing medium is produced, in accordance with this principle, by dissolving in 160 pounds of water, 50 pounds of potassium chlorid, 22 pounds sodium carbonate and 13 pounds of sodium bicarbonate. This is a solution which is saturated at 32° F. The colloid added to this solution for the purpose of suspending or preventing precipitation of the eliminated salt is added in the form of starch, about two pounds, such starch having first been brought to the boiling point in a separated portion of the solution and then mixed with the remainder. This mixture is filled into the container 11 which constitutes the bulb element.

Furthermore, the bulb element is designed so that such mixture freezes progressively in a predetermined direction. This may be accomplished in a variety of ways. As shown, the element is of tapered form which causes the freezing to start at the thinner or bottom end and proceed to the top, which is thus the last to freeze; but it will be understood that the same result may be effected in numerous ways, if desired, without reference to the particular design of the element itself.

In any case, congelation of the freezing medium within the container is progressive as from the bottom to the top of the container and thus makes the resulting pressure available for transmission through a tube such as 12 to the bellows or other translating device.

The operation of the apparatus thus far described is therefore as follows: When the compressor 1 is called into play the refrigerant is circulated through the path outlined above, including the inlet pipe 5, the vaporizer 6 and hence back to the pump. The cooling effect of the refrigerant circulating in the vaporizer 6 causes the gradual freezing of the medium in the receptacle 7 and in the container 11. As explained above the freezing in the latter progresses from the bottom of the container toward the top, resulting in the exertion of considerable pressure at the upper end of the container, and, according to the illustrated embodiment of the invention, this pressure is utilized to effect the control of the motor 2 and hence the compressor. The relative positions of the main body of the freezing or storage medium and of the bulb element are predetermined with a view to bringing about a freezing and thawing action in both of them at substantially the same rate so that when the storage medium is frozen the contents of the bulb element will also be frozen and in reaching this condition its expansion will cut off the motor, the reverse action resulting in the starting up of the motor, as will be understood. The particular means employed for starting and stopping the motor is of course subject to variation but in the present instance it is shown as comprising the pipe 12 sealed into the top of the container 11 and having its other end opening into a piston device or metallic bellows 13 the fixed end of which is carried by a supporting bracket 14. If desired, the pipe 12 and the bellows may be filled with oil or the like, or, again, the entire system may be filled with the freezing medium. The free end of the bellows, by means of the cup member 15, acts through a rod 16, and the adjustable collars 17 thereon, upon a switch generally designated 18 and controlling the motor circuit, the switch shown being a well-known mercury type. The reverse operation of the switch—that is, when the freezing medium melts—is effected by means of the spring 19 which also returns the bellows to its closed position. The collars 17 are preferably set to operate the switch and start the motor when the freezing medium is about 90 per cent melted, or less, so as to avoid any possibility of an increase of temperature above the constant temperature desired to be maintained.

In the illustrated embodiment of the invention the bulb element 11 is shown as mounted within the evaporator 7 and is thus subject to the refrigerant effect independently of the freezing medium in the receptacle 7. This arrangement is preferred, but it is to be understood that the operating condition which the invention calls for will be broadly satisfied regardless of the location of the element, provided it is subject to the same or similar thermal conditions as the main body of storage medium, so as to keep step therewith in the processes of freezing and thawing.

I claim:

1. An expansion control device of the kind described comprising a movable controlling element, a tapered container holding a medium whose freezing temperature is substantially the same as the temperature to be maintained and means for communicating the expansion pressure of said medium at the larger end of the container to the controlling element.

2. In a refrigerating apparatus the combination of a refrigerating means and control mechanism therefor, a bulb element containing a freezing salt solution and means for preventing the cumulative precipitation of the salt therein, and a connection between the bulb element and said mechanism whereby the latter is operated by the change of volume of the solution.

3. A refrigerating unit of the kind described comprising a plate form vaporizer surrounded by a receptacle containing a storage medium, said receptacle extending beyond the vaporizer and forming a shoulder, a well tube formed in said receptacle at the shoulder, a thermal bulb element located in said tube, and means operated by the varying pressure of the medium in said bulb element for controlling the refrigerant flow through the vaporizer.

4. In a refrigerating system, the method of maintaining a uniformly low temperature which consists in subjecting a salt solution freezing medium to the action of a circulated refrigerant, applying the volumetric changes incident to the congelation and liquefaction of said medium to control the refrigerant circulation and preventing the cumulative precipitation of the salt in said medium.

5. In a refrigerating apparatus the combination of a freezing unit containing a salt solution, a compressor adapted to circulate a refrigerant in heat-exchanging relationship to the unit to freeze the contents thereof, a separate body of said salt solution arranged to be subject to like thermal conditions to said unit, means for controlling the refrigerant circulation connected for operation by the volumetric changes of said body of salt solution incident to congelation and liquefaction, and means for preventing the cumulative precipitation of the salt in said solutions.

In testimony whereof, I have signed this specification.

LAWRENCE E. WARNER.